Dec. 21, 1943   C. A. TEA   2,337,506
RIVET STICKING DEVICE
Filed July 20, 1942
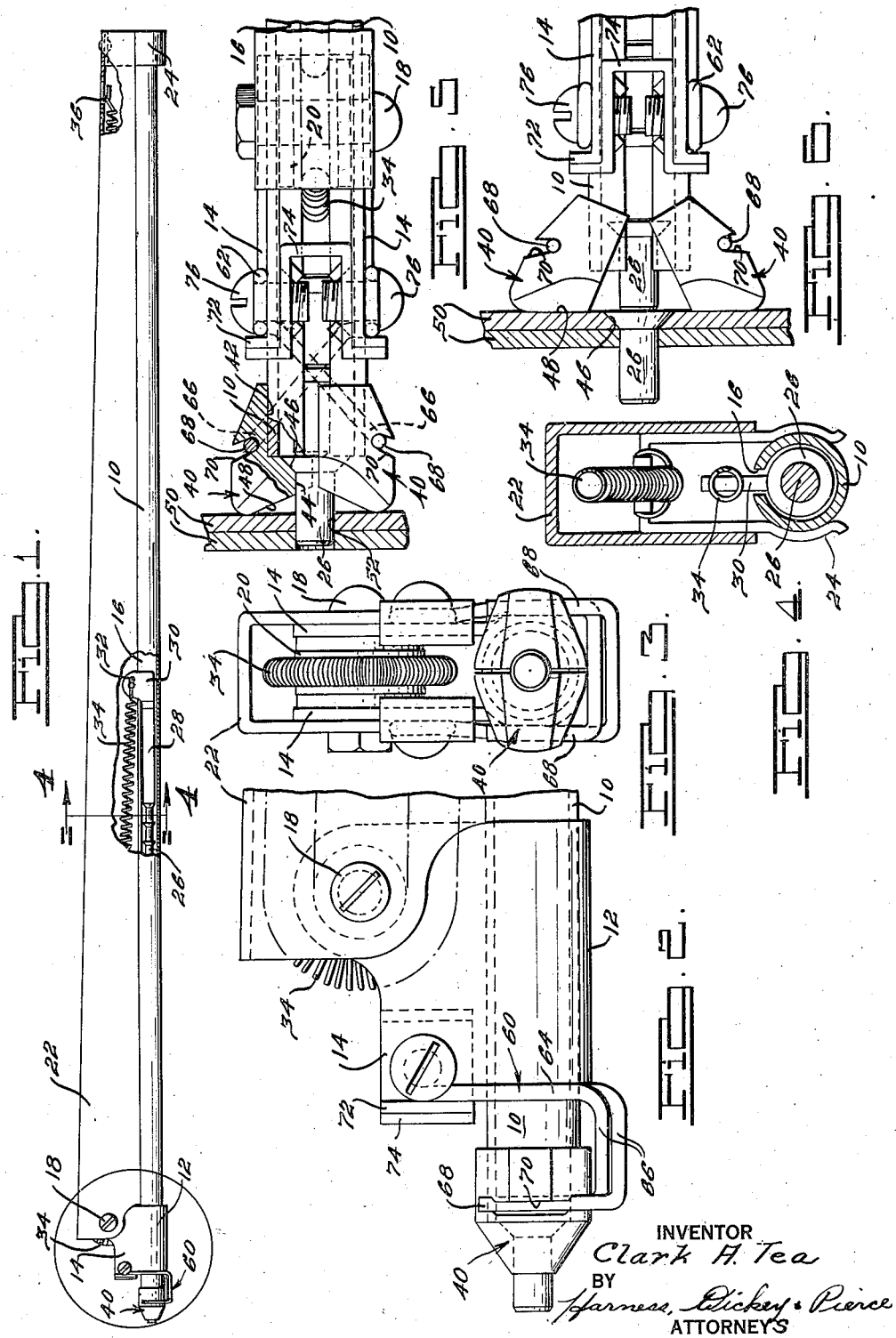
INVENTOR
Clark A. Tea
BY Harness, Dickey & Pierce
ATTORNEYS Patented Dec. 21, 1943

2,337,506

UNITED STATES PATENT OFFICE 2,337,506

RIVET STICKING DEVICE

Clark A. Tea, Detroit, Mich., assignor to The Murray Corporation of America, Detroit, Mich., a corporation of Delaware Application July 20, 1942, Serial No. 451,560

9 Claims. (Cl. 78—46)

This invention relates to rivet sticking devices and particularly to devices for delivering rivets from one end thereof and having means for releasing a rivet therefrom after the rivet has been inserted in an aperture. It constitutes an improvement over the structures shown and claimed in the joint application for Letters Patent of the United States filed by myself and Alfred H. Haberstump under date of December 4, 1941, for improvements in Rivet stickers and serially numbered 421,590. The principal object of the present invention is the provision of an improved form of construction for the delivery end of such rivet stickers.

In the prior joint application above identified the rivet sticker was provided with a pair of spring wire elements at the delivery end thereof which cooperated between them to releasably hold the rivets in the tube of the sticker and which spring wire elements were so constructed and arranged that when the projecting end of the endmost rivet in the sticker was inserted in a hole in a piece of work and the rivet sticker pushed against the work to be riveted, such end rivet was automatically released from the sticker and remained in the hole when the sticker was removed. Experience gained from actual use of the rivet stickers disclosed in said prior joint application has shown that it is difficult to construct such wire elements at the delivery end of the stickers with such accuracy that all rivets will be evenly released in all stickers made and that unless such spring wires are accurately formed and the sticker is properly handled by the workman a rivet may be cocked in being delivered from the sticker with the consequent delay in the operation.

It is, therefore, the object of the present invention to provide a new and improved rivet release mechanism for a rivet sticking device; to provide a new and improved rivet release mechanism for the preferred types of rivet sticking devices shown and claimed in the above identified joint application; to provide a rivet release mechanism for the end of a rivet sticking device including a pair of spring pressed jaw members each of which is of rigid and non-yielding character per se but which is movably mounted and resiliently urged towards its normal position; and to provide a rivet release mechanism for the end of a rivet sticking device which is simple in construction, rugged in character and which is capable of releasing the rivets from the device in an accurate and efficient manner.

The above being among the objects of the present invention the same consists in certain novel features of construction and combinations of parts to be hereinafter described with reference to the accompanying drawing, and then claimed, having the above and other objects in view.

In the accompanying drawing which illustrates a suitable embodiment of the present invention and in which like numerals refer to like parts throughout the several different views, Fig. 1 is a partially broken, partially sectioned side elevational view of a rivet sticker including an improved rivet release mechanism constructed in accordance with the present invention;

Fig. 2 is an enlarged, fragmentary, side elevational view of that end portion of the rivet sticker shown in Fig. 1 including the improved rivet release mechanism of the present invention;

Fig. 3 is an end elevational view of that end of the structure shown in Fig. 2;

Fig. 4 is an enlarged, transverse, vertical sectional view taken on the line 4—4 of Fig. 1;

Fig. 5 is a fragmentary, partially broken, plan view of that end of the rivet sticker shown in Fig. 2 with the jaws in normal or closed position and illustrating the same in the position which it initially assumes in applying a rivet to a piece of work; and, Fig. 6 is a view similar to Fig. 5 but illustrating the jaws opened up to release the rivet which has been entered in the work.

In the first ten figures of the drawings in said prior joint application above identified there is shown one preferred form of construction and two modified forms of construction all of which incorporate substantially the same spring wire construction of rivet release mechanism. It will be appreciated that the present invention is applicable to such preferred form or to either of said modified form of construction but, as a matter of illustration only, the form of rivet sticking device shown in the accompanying drawing follows said preferred form more closely.

Reference to said prior co-pending joint application above identified may be had for a more complete disclosure of the main body portion of the rivet sticker device shown herein, but briefly stated it will be understood that it includes a longitudinally slotted tube 10 one end of which is partially surrounded by a sheet metal bracket element 12 rigidly secured thereto and the free edges 14 of which project laterally to one side of the tube 10 to form flanges and are arranged in spaced and parallel relation with respect to each other and equally on either side of and in planes parallel to a radial plane passing through the axis of the tube 10 and centrally of the slot 16 therein. A pin 18 projects transversely through the flanges 14 adjacent the righthand end thereof as viewed in the drawing and rotatably supports thereon between the flanges 14 a sheave 20. Also rotatably supported on the pin 18 outside of the flanges 14 is one end of a channel sectioned sheet metal cover element 22 which extends therefrom to the opposite end of the tube 10 and is there provided with a spring clip 24 which is adapted to releasably engage the corresponding end of the tube 10 to normally hold the cover 22 in closed or operating position.

The tube 10 is adapted to receive internally thereof a plurality of rivets 26 arranged in end-to-end relationship and the rivets 26 are constantly and resiliently urged towards the delivery end of the sticker device by means of a plunger 28 which is reciprocably received in the tube 10 behind the rivets 26. The plunger 28 is provided with a part or projection 30 which projects up through the slot 16 in the tube 10 and is provided with an elongated slot 32 therein into which one end of a coiled tension spring 34 is hooked. From the projection 30 the coil spring 34 extends towards the delivery end of the device where it passes under the sheave 20 and then back over the top of the same and then extends to the opposite end of the device within the cover 22 to which such end is secured as at 36. The construction thus far described, except for the specific construction of the bracket 12, is substantially identical to the preferred construction disclosed and claimed in said prior joint application above identified.

Instead of employing the spring wire rivet gripping and releasing devices as in said prior joint application above identified at the delivery end of the tube 10, in accordance with the present invention a pair of solid jaw members indicated generally at 40 are employed. The jaw members 40 are identical to each other and are arranged in opposed relation with respect to each other on opposite sides of a plane including the axis of the tube 10. Each jaw member 40 at its righthand end and as particularly brought out in Fig. 5 is internally provided with a semi-cylindrical socket portion 42 which is normally adapted to fit the exterior surface of the corresponding end of the tube 10 as shown. At its opposite end each jaw 40 is provided with a semi-cylindrical socket portion 44 of a radius corresponding with the radius of the main body portion of a rivet 26 and arranged with its axis normally aligned with the axis of the tube 10. The socket portions 42 and 44 of each jaw 40 are connected by a semi-frusto-conical portion 46 which is adapted to fit the tapered side face of the head of a rivet 26, all as indicated in Fig. 5. Thus, as indicated in Fig. 5, when the two jaw members 40 are in their normally closed position in which the socket portions 42 grip the exterior surface of the corresponding end of the tube 10, the socket portions 44 and 46 of the opposed jaw members cooperate to form between them a recess which substantially fits the head of the rivet and that portion of the main body of the rivet immediately adjacent the head thereof, allowing the greater portion of the length of the main body portion of the rivet to project therebeyond.

The operative end faces of the jaws 40 are cut away or tapered as at 48 toward the axis of the tube 10 so that when the rivet sticking device is applied to a piece of work such as the overlapping plates 50 indicated in Figs. 5 and 6 and the projecting end of the outermost rivet 26 inserted in a hole such as 52 therein provided for the reception of the same, and pressure is applied axially to the rivet sticking device tending to press the jaws 40 against the face of the work, the operative ends of the jaws 40 will be caused to move away from each other to the position indicated in Fig. 6, pivoting about the points of contact of their rear edges with the outer surface of the tube 10 during such movement, which will thus release the endmost rivet 26 in the device and permit the pressure of the spring 34 to drive it into the opening 52 as far as the head of the rivet will permit.

The jaws 40 must, of course, be so supported on the device that they will be held in the proper position axially of the device and normally in the closed position indicated in Fig. 5 in which they prevent the rivets from being ejected from the tube 10. At the same time the jaws 40 must be so supported as to yield laterally away from each other when they are pressed against the surface of a piece of work so as to permit the endmost rivet to be ejected therefrom under the force of the spring 34.

In order to thus support the jaws 40 a pair of spring wire elements indicated generally at 60 are employed. Each spring element 60 includes at one end thereof an eye 62 from which the spring element extends downwardly as at 64, in substantially tangent relation to the outer surface of the tube 10, to a point below the forward end of the tube 10 and below the jaws 40 where it is connected to a horizontally disposed portion 66 which extends toward the operative end of the device and across to the opposite side thereof, the portions 56 of the two elements 60 thus crossing over one another as shown. After crossing over to the opposite side of the jaws 40 each horizontally extending portion 66 is provided with an upwardly extending end portion 68. The upwardly extending portions 68 are each received in a groove 70 formed in the corresponding jaw member 40 and these grooves 70, as perhaps best brought out in Fig. 5, in extending inwardly towards the center of the device are inclined away from the operative end face thereof.

In order to secure the spring wire elements securely at one end with respect to the device, the forward edges of the flanges 14 of the bracket 12 are outwardly bent or flanged as at 72, best shown in Figs. 5 and 6, and a channel-shaped member 74 of a width equal to the spacing of the flanges 14 is received therein and the free marginal edge portions thereof are outwardly bent or flanged over the outwardly turned edges 72 of the flanges 14 as indicated in Figs. 5 and 6. As best indicated in Fig. 2 the vertical run 64 of each spring wire element 60 is seated against the rear face of the corresponding flange 72 with the corresponding eye 62 resting flat against the outer face of the adjacent portion of the corresponding flange 14, and screws 76 are projected through the eyes 62 and through the corresponding flange 14 and are threaded into the member 74 inwardly thereof. This form of connection serves to rigidly anchor the corresponding end of the spring element 60 against relative movement with respect to the bracket 12.

The spring elements 60 are initially of such shape that when assembled with the jaw members 40 a constant pressure is exerted tending to move the jaw members 40 towards one another, such movement being, of course, limited by engagement of the socket portions 42 of the jaw members 40 with the outer surface of the end of the tube 10 as previously described. Thus when the device is placed against a piece of work such as illustrated in Fig. 5 and axial pressure is applied thereto, the end portions 68 of the spring elements in the grooves 70 restrict the axial movement of the jaw members 40 and the pressure between the jaw members 40 and the work being further out from the axial center of the tube 10 than the point of bearing between the end portions 68 and the jaw members, the jaw members are simply cammed outwardly against the force of the springs 60 until their end surfaces 48 lie flat against the work, as illustrated in Fig. 5. The arrangement of the supporting springs is such that the rivets cannot be forced out the delivery end of the tube by the static spring (follower) pressure or through shock as caused by riveting. The concurrent force system, plus a small initial tension on the jaws, prevents this.

When the jaw elements 40 are in the last described positions they are separated sufficiently to permit the head of the endmost rivet 26 to be ejected from between them and further spreading movement of the jaw members is prevented because they now engage against the work radially inwardly of the line of connection between the ends 68 and the jaw member as well as outwardly therefrom. The alignment of the jaw members 40 with the tube 10 in the open position illustrated in Fig. 6 is maintained because the socket portions 42 thereof are still engaged on the end of the tube 10 and, when pressure on the tool is relieved, the jaw members 40 snap back into position thus to prevent the next rivet 26 from being ejected until they are again opened. When closed the jaw members 40 are again accurately aligned with the end of the tube 10 because the socket portions 42 thereof are engaged with the outer end of the tube over substantially the full length of such socket.

It will be appreciated from the above that inasmuch as the jaw members 40 are of solid construction and because of the fact that they are so related to the end of the tube 10 as to maintain their alignment with the tube and with each other at all times, they are capable of efficiently and accurately doing the work intended for them and are capable of being made in large numbers all of which are assured of working in an equal and uniform manner.

Having thus described my invention, what I claim by Letters Patent is:

1. In a rivet sticking device of the class wherein a plurality of rivets are adapted to be received within a tube and constantly urged in one direction therein, the combination with said tube of a pair of opposed jaw members hingedly mounted on one end thereof, the end surfaces of said jaw members being shaped to contact a piece of work radially outwardly of the center of said tube beyond said point of hinging, spring means fixed with respect to said tube cooperating with said jaw members to constantly urge them toward contracted position, and abutment surfaces formed on the opposed faces of said jaw members and engageable with the endmost rivet in said tube to prevent ejection thereof when said jaw members are in their contracted position, pressure between said jaw members and said work adapted to hingedly spread said jaw members against the force of said spring means whereby to permit said endmost rivet to be ejected from between said jaw members.

2. In a rivet sticking device of the class wherein a plurality of rivets are adapted to be received within a tube and constantly urged in one direction therein, the combination with said tube of a pair of opposed jaw members movably received on one end thereof, said jaw members being formed with opposed recesses at one end thereof forming a socket for reception of the corresponding end of said tube when said jaw members are in closed position and formed at their opposite ends to provide opposed recesses for reception of the body of a rivet receivable therebetween, an abutment formed on each of said jaw members between said recesses therein for engagement with the head of a rivet received therebetween to limit axial movement thereof, the ends of said jaw members being formed for engagement with the surface of a piece of work radially outwardly beyond the radially outer surface of said tube only when said jaws are in closed position, and means constantly urging said jaws toward closed position.

3. In a rivet sticking device of the class wherein a plurality of rivets are adapted to be received within a tube and constantly urged in one direction therein, the combination with said tube of a pair of opposed jaw members movably received on one end thereof, said jaw members being formed with opposed recesses at one end thereof forming a socket for reception of the corresponding end of said tube when said jaw members are in closed position and formed at their opposite ends to provide opposed recesses for reception of the body of a rivet receivable therebetween, an abutment formed on each of said jaw members between said recesses therein for engagement with the head of a rivet received therebetween to limit axial movement thereof, the ends of said jaw members having projecting portions by which the jaw members are rocked to rivet-releasing position when forced against a flat surface of a workpiece.

4. In a rivet sticking device of the class wherein a plurality of rivets are adapted to be received within a tube and constantly urged in one direction therein, the combination with said tube of a pair of opposed jaw members which are pivotally supported on one end thereof and internally formed to provide an abutment for engagement with the head of a rivet when said jaws are closed to prevent ejection of said rivet from said device, the end surfaces of said jaw members diverging away from each other axially away from the corresponding end of said tube and extending radially with respect to the axis of said tube a distance greater than the radius of said point of pivotal support whereby when said jaw members are pressed against the piece of work by pressure acting axially of said tube the jaw members tend to separate one from another and withdraw said abutment surfaces from engagement with the head of said rivet, and means constantly urging said jaw members toward closed position.

5. In a rivet sticking device of the class wherein a plurality of rivets are adapted to be received within a tube and constantly urged in one direction therein, the combination with said tube of a pair of opposed jaw members hinged relative to each other on one end thereof and internally formed to provide an abutment for engagement with the head of a rivet when said jaws are closed to prevent ejection of said rivet from said device, the end of said jaw members diverging away from each other axially away from the corresponding end of said tube and extending radially with respect to the axis of said tube a distance greater than the radius of the point of hinge of said jaw members whereby when said jaw members are pressed against the piece of work by pressure acting axially of said tube the jaw members tend to separate one from another, and withdrawn said abutment surfaces from engagement with the head of said rivet, and spring means cooperating between said tube and said jaw members maintaining the position of said jaw members axially of said tube and constantly urging said jaw members toward closed position.

6. In a rivet sticking device of the class wherein a plurality of rivets are adapted to be received within a tube and constantly urged in one direction therein, the combination with said tube of a pair of opposed jaw members movably received on one end thereof and internally formed to provide an abutment for engagement with the head of a rivet when said jaws are closed to prevent ejection of said rivet from said device, the end surfaces of said jaw members diverging away from each other axially away from the corresponding end of said tube and extending radially with respect to the axis of said tube a distance greater than the radius of the exterior surface of said tube whereby when said jaw members are pressed against the piece of work by pressure acting axially of said tube the jaw members tend to separate one from another and withdraw said abutment surfaces from engagement with the head of said rivet, said jaw members each having a groove in an outer face thereof between the ends thereof, and a pair of spring elements each fixed at one end thereof with respect to said tube and having the opposite end thereof received in said groove of a corresponding one of said jaws, said spring element constantly urging said jaw members toward one another and limiting axial movement thereof with respect to said tube.

7. In a rivet sticking and releasing device, a rivet supporting element, jaw members pivoted on said element at one end thereof, means on the end of said jaw members for preventing the delivery of rivets therefrom, portions on the ends of said jaw members extending outwardly of the center line between said members a greater distance than the extension of their points of pivot to permit the jaw members to separate when pressure is applied to the extending portions thereof.

8. In a rivet sticking and delivering device, a tube for supporting rivets, jaw members for engaging the endmost rivet and preventing its delivery from said tube, spring means for urging said jaw members toward each other, work-contacting portions on said jaw members extending outwardly on the tube axis beyond said spring means to permit said jaw members to separate when pressure is applied thereto at said contact points.

9. In a rivet sticking and delivering device, a tube for supporting rivets, jaw members on one end of said tube for securing the endmost rivet within the tube, spring means supporting said jaw members on said tube and about which the jaw members pivot when actuated, and contact points on said jaw members extending beyond the end thereof and located a greater distance from the tube axis than the distance of said point of pivot is located therefrom.

CLARK A. TEA.